(12) United States Patent
Wang et al.

(10) Patent No.: US 6,965,212 B1
(45) Date of Patent: Nov. 15, 2005

(54) METHOD AND APPARATUS FOR FIELD WEAKENING CONTROL IN AN AC MOTOR DRIVE SYSTEM

(75) Inventors: Zheng Wang, Mississauga (CA); Jack Daming Ma, Mississauga (CA); George You Zhou, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/998,721

(22) Filed: Nov. 30, 2004

(51) Int. Cl.$^7$ .............................................. H02P 5/28
(52) U.S. Cl. ...................... 318/700; 318/701; 318/801; 318/802
(58) Field of Search .............................. 318/700, 701, 318/702, 771, 772, 779, 801–805

(56) References Cited

U.S. PATENT DOCUMENTS

| | | |
|---|---|---|
| 4,088,934 A | 5/1978 | D'Atre et al. |
| 4,238,821 A | 12/1980 | Walker |
| 4,270,078 A | 5/1981 | Walker et al. |
| 4,677,360 A | 6/1987 | Garces |
| 4,680,695 A | 7/1987 | Kerkman et al. |
| 4,719,398 A | 1/1988 | Paice |
| 4,724,373 A | 2/1988 | Lipo |
| 4,740,738 A | 4/1988 | El-Antably et al. |
| 4,751,438 A | 6/1988 | Markunas |
| 4,780,657 A | 10/1988 | Brown et al. |
| 4,788,635 A | 11/1988 | Heinrich |
| 4,885,518 A | 12/1989 | Schauder |
| 5,032,771 A | 7/1991 | Kerkman et al. |
| 5,168,204 A | 12/1992 | Schauder |
| 5,504,404 A | 4/1996 | Tamaki et al. |
| 5,510,689 A | 4/1996 | Lipo et al. |
| 5,559,419 A | 9/1996 | Jansen et al. |
| 5,565,752 A | 10/1996 | Jansen et al. |
| 5,569,995 A | 10/1996 | Kusaka et al. |
| 5,585,709 A | 12/1996 | Jansen et al. |
| 5,652,495 A | 7/1997 | Narazaki et al. |

(Continued)

OTHER PUBLICATIONS

Maric, D.S., et al., "Two improved flux weakening schemes for surface mounted permanent magnet synchronous machine drives employing space vector modulation," (Dept. of Electr. Eng., California Inst. of Technol., Pasadena, CA, USA); IECON '98, Proceedings of the 24$^{th}$ Annual Conference of the IEEE Industrial Electronics Society, New York, NY, USA: IEEE 1998, p. 508-12, vol. 1 of 4 vol.

(Continued)

*Primary Examiner*—Paul Ip
(74) *Attorney, Agent, or Firm*—Larry J. Palguta

(57) ABSTRACT

A method and apparatus control a power converter (20) of an AC motor drive system (10). The method and apparatus: generate a field current regulating signal to control a field current component flowing from the power converter (20) to the AC motor (30), thereby achieving field current regulation; generate a torque current regulating signal to control a torque current component flowing from the power converter (20) to the AC motor (30), thereby achieving torque current regulation, the torque current regulation having lower priority than the field current regulation; and execute a close-loop field weakening control scheme, which generates a field weakening control command as a function of the difference between a torque current regulation voltage demand and voltage available for torque current regulation. The field current regulating signal is adjusted in accordance with the field weakening control signal to selectively reduce back EMF of the AC motor (30), thereby enabling the step of generating a toque current regulating signal to achieve a toque current component needed to drive the AC motor (30) at a desired speed despite a limitation on DC voltage available to the power converter (20).

28 Claims, 3 Drawing Sheets

U.S. PATENT DOCUMENTS

| | | | |
|---|---|---|---|
| 5,659,235 A | 8/1997 | Yamada et al. | |
| 5,729,113 A | 3/1998 | Jansen et al. | |
| 5,739,664 A | 4/1998 | Deng et al. | |
| 5,818,192 A | 10/1998 | Nozari | |
| 5,936,372 A * | 8/1999 | Nashiki et al. | 318/701 |
| 6,014,006 A | 1/2000 | Stuntz et al. | |
| 6,069,467 A | 5/2000 | Jansen | |
| 6,137,258 A | 10/2000 | Jansen | |
| 6,163,127 A | 12/2000 | Patel et al. | |
| 6,163,128 A | 12/2000 | Hiti et al. | |
| 6,184,648 B1 * | 2/2001 | Kato et al. | 318/811 |
| 6,222,335 B1 | 4/2001 | Hiti et al. | |
| 6,242,884 B1 | 6/2001 | Lipo et al. | |
| 6,288,515 B1 | 9/2001 | Hiti et al. | |
| 6,344,725 B2 | 2/2002 | Kaitani et al. | |
| 6,362,585 B1 | 3/2002 | Hiti et al. | |
| 6,407,531 B1 * | 6/2002 | Walters et al. | 318/805 |
| 6,433,506 B1 | 8/2002 | Pavlov et al. | |
| 6,472,842 B1 | 10/2002 | Ehsani | |
| 6,504,329 B2 | 1/2003 | Stancu et al. | |
| 6,737,828 B2 * | 5/2004 | Kiuchi et al. | 318/779 |
| 6,763,622 B2 * | 7/2004 | Schulz et al. | 318/700 |
| 6,876,169 B2 * | 4/2005 | Gallegos-Lopez et al. | 318/701 |
| 6,894,454 B2 * | 5/2005 | Patel et al. | 318/700 |
| 2004/0070362 A1 * | 4/2004 | Patel et al. | 318/701 |
| 2004/0257028 A1 * | 12/2004 | Schulz et al. | 318/802 |

OTHER PUBLICATIONS

Sudhoff et al., "A Flux-Weakening Strategy for Current-Regulated Surface-Mounted Permanent-Magnet Machine Drives," (Sch. of Electr. Eng., Missouri Univ., Rolla, MO, USA); IEEE Transactions on Energy Conversion, Sep. 1995, vol. 10, No. 3, pp. 431-437.

Song et al., "A New Robust SPMSM Control to Parameter Variations in Flux Weakening Region," (Hyosung Industry Co., Ltd., Seoul, South Korea); Proceedings of the 1996 IEEE IECON. 22$^{nd}$ Internatioanl Conference on Industrial Electronics, Control, and Instrumentation, New York, NY, USA: IEEE 1996, pp. 1193-1198, vol. 2 of 3 vol.

Maric et al., "Robust Flux Weakening Scheme for Surface-Mounted Permanent-Magnet Synchronous Drives Employing an Adaptive Lattice-Structure Filter," (Dept. of Electr. Eng., California Institute of Technology); APEC '99. Fourteenth Annual Applied Power Electronics Conference and Exposition. 1999 Conference Proceedings, Piscataway, NJ, USA: IEEE, 1999, pp. 271-276, vol. 1 of 2 vol.

* cited by examiner

METHOD AND APPARATUS FOR FIELD WEAKENING CONTROL IN AN AC MOTOR DRIVE SYSTEM

FIELD OF THE INVENTION

The present invention relates to inverter control in an AC motor drive system, and more particularly to a method and apparatus for controlling field weakening in an AC motor drive system.

BACKGROUND OF THE INVENTION

Voltage source inverter feed AC motor drives have become increasingly popular in general industrial applications, as well as in transportation vehicles such as electrical propulsion systems. In such applications, a wide operating speed range above the base speed (e.g., a high speed cruise) is often required. The recently emerging "more electrical" aircraft concept has also created more demand for AC motor drives in aerospace applications, such as for supplying engine starter, fan, and pump loads. Because of the limited DC bus voltage on aircraft and high output power rating requirement, some of these drive systems must be designed to operate at field weakening mode even at the rated operating point to achieve maximum voltage/current utilization and high efficiency operation. This makes field weakening control a critical part of the motor controller design.

When motor speed is lower than base speed, the inverter can provide enough voltage to support motor back EMF, so that field weakening is not required. When motor speed is higher than base speed, however, motor back EMF will exceed the inverter output voltage capability unless field weakening is applied. Thus, field weakening must be implemented to reduce the effective back EMF to achieve high-speed operation above base speed.

One basic field-weakening technique, such as the one applied in U.S. Pat. No. 6,407,531 issued to Walters et al. on Jun. 18, 2002, relies on a look up table. This kind of technique, however, requires that a large quantity of data be created off line and stored in the memory to achieve optimal field weakening control under any DC link voltage and any load conditions. Furthermore, sufficient margin must be factored in for parameter variation and the extra voltage needed during transition state. As such, the inverter output voltage capability cannot be fully utilized, which is a significant drawback for aerospace applications because it is directly related to the inverter size and weight.

Another approach to flux weakening is to calculate, on-line, the field weakening current from motor equations. Such an approach is described in U.S. Pat. No. 5,739,664 issued to Deng et al. on Apr. 14, 1998 and U.S. Pat. No. 6,504,329 issued to Stancu et al. on Jan. 7, 2003. These approaches, however, are very sensitive to uncertainties related to the system parameters and equations will be very complex for systems with an AC side output LC filter. A sufficient margin must be factored in to ensure stable system operation even with parameter variation. Thus, inverter output capability cannot be fully utilized.

A known field weakening control scheme is a close loop method, which does not use machine parameters for calculations in the field weakening operation. This control scheme should be able to adjust field-weakening current automatically during transient and steady state according to DC link voltage and load conditions. U.S. Pat. No. 5,168,204 issued to Schauder on Dec. 1, 1992, U.S. Pat. No. 6,288,515 issued to Hiti et al. on Sep. 11, 2001 and the paper authored by J. H. Song, J. M. Kim and S. K. Sul, entitled "A New Robust SPMSM Control to Parameter Variations in Flux Weakening Region," Proc. IECON'96, pp. 1193–1198, 1996, provide techniques that possess these features. These techniques adjust field-weakening current according to the inverter output voltage amplitude. There is no need for machine parameters but the choice of parameters in the field-weakening loop is still critical for the stability of the system. Because such techniques are close-loop based, during transition both d-axis and q-axis current loops lose control due to the shortage of voltage and over modulation will also occur, which will cause high frequency resonance for systems with AC side output LC filters. Unfortunately, many drive systems in aerospace applications require LC filters for the tough EMI requirements and the long cable between inverter and motor.

SUMMARY

According to one aspect, the present invention is a method of controlling a power converter of an AC motor drive system, the method comprising: generating a field current regulating signal to control a field current component flowing from the power converter to the AC motor, thereby achieving field current regulation; generating a torque current regulating signal to control a torque current component flowing from the power converter to the AC motor, thereby achieving torque current regulation, the torque current regulation having lower priority than the field current regulation; and executing a close-loop field weakening control scheme, which generates a field weakening control command as a function of the difference between a torque current regulation voltage demand and voltage available for torque current regulation, wherein the field current regulating signal is adjusted in accordance with the field weakening control signal to selectively reduce back EMF of the AC motor, thereby enabling the step of generating a toque current regulating signal to achieve a toque current component needed to drive the AC motor at a desired speed despite a limitation on DC voltage available to the power converter.

According to another aspect, the present invention is directed to a power converter controlling apparatus for controlling a power converter of an AC motor drive system, the controlling apparatus comprising: a field current controller for generating a field current regulating signal to control a field current component flowing from the power converter to the AC motor, thereby achieving field current regulation; a torque current controller for generating a torque current regulating signal to control a torque current component flowing from the power converter to the AC motor, thereby achieving torque current regulation, the torque current regulation having lower priority than the field current regulation; and a field weakening controller for executing a close-loop field weakening control scheme, which generates a field weakening control command as a function of the difference between a torque current regulation voltage demand and voltage available for torque current regulation, wherein the field current controller adjusts the field current regulating signal in accordance with the field weakening control signal to selectively reduce back EMF of the AC motor, thereby enabling the torque current controller to output a torque current regulating signal to achieve a torque current component needed to drive the AC motor at a desired speed despite a limitation on DC voltage available to the power converter.

BRIEF DESCRIPTION OF THE DRAWINGS

Further aspects of the present invention will become apparent from the following description taken in conjunction with the accompanying drawings, wherein.

DETAILED DESCRIPTION

In one aspect, an embodiment of the present invention described below applies field weakening control in an AC motor drive system to maximize efficiency and power density by fully utilizing available DC bus voltage and minimizing the inverter current dynamically, and to ensure stable system operation when in a voltage limiting mode. In one embodiment, field weakening is initiated at a point that is adjusted, "on line," based on DC link voltage, which is typically not fixed in certain environments, such as on aircraft. In one implementation, transition to field weakening is achieved automatically and smoothly, without the need for a look-up table or knowledge of system parameters. In an embodiment of the present invention described below, a field weakening reference current is always maintained under the voltage limit condition, while a torque reference current is controlled with the limit of available DC bus voltage and the voltage that has already been used for generating the required field generating current. Thus, the field current demand has higher priority than the torque current under the limitations of both DC link voltage and inverter maximum current. In this way, a stable field is always guaranteed, which is a basic condition of a stable operation for a motor drive system.

Figure 1:
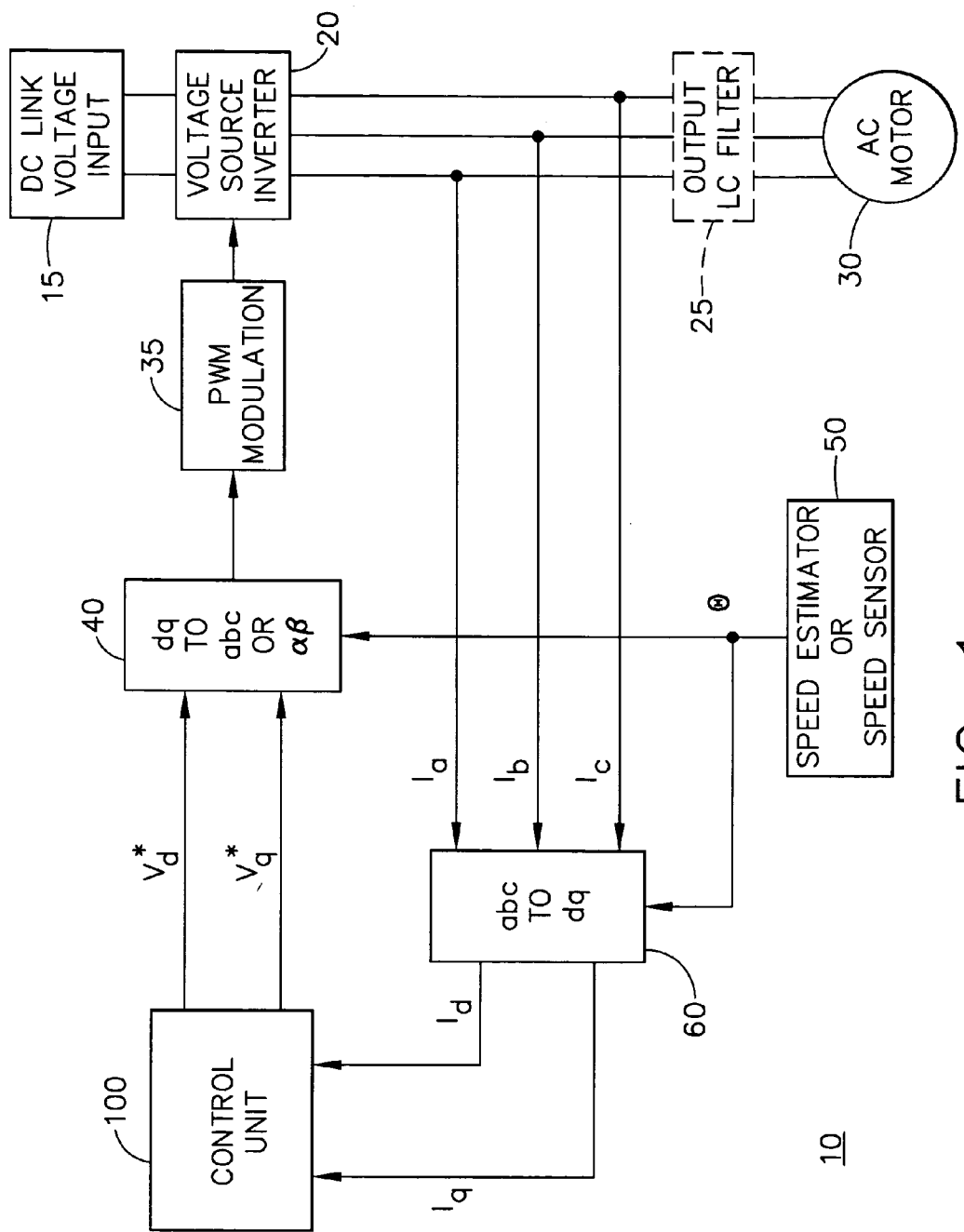
FIG. 1 is a block diagram illustrating an AC motor drive system to which principles of the present invention may be applied.

FIG. 1 illustrates an exemplary voltage source inverter feed vector controlled AC motor drive to which principles of the present invention may be applied. As illustrated, the AC motor drive system 10 includes: a DC link voltage input 15; a voltage source inverter 20 receiving DC power from the DC link voltage input 15; a pulse width modulation unit 35, which controls gating of the voltage source inverter 20 (e.g., utilizing a configuration of insulated-gate bipolar transistors (IGBTs)) so that the inverter 20 converts supplied DC voltage to multi-phase AC power; an AC motor 30, which is supplied multi-phase AC power via the inverter 20; and a control unit 100 for generating direct-, quadrature-axis inverter command reference voltages ($V_d^*$, $V_q^*$). An LC filter 25 may be included on the AC side of the inverter 20.

The system 10 includes a transforming unit 60 for transforming multi-phase line current values $I_a$, $I_b$, $I_c$ to d-q reference frame quantities $I_q$, $I_d$ (e.g., using well known Clark and Park transforms), which are input to the control unit 100. An additional transform unit transforms voltage reference signal $V_d^*$, $V_q^*$ output by the control unit 100 to multi-phase voltage commands $V_a$, $V_b$, $V_c$ or stationary stator frame voltage commands $V_\alpha$, $V_\beta$. A speed sensor or speed estimator 50 determines rotor positioning/speed of the rotor of the AC motor 30.

Vector control or field-oriented control is one technique used in motor drives to control the speed and torque of AC motors. The control is conducted in a synchronous reference frame, i.e., the d-q frame. With this technique, motor stator current is resolved into a torque producing (q-axis) component of current, $I_q$, and a field producing (d-axis) component of current, $I_d$, where the q-axis leads the d-axis by 90 degrees in phase angle. The terminal voltage of the inverter is also resolved into the d-axis and q-axis components. As shown in FIG. 1, the phase angle of the synchronous reference frame can be from a speed/position sensor or from a speed estimator (i.e., for a speed sensorless controlled system). The q-axis current reference is typically output by a speed controller or a torque controller. The d-axis current reference is typically output from a field-weakening controller. The error signals between reference current and actually detected current are fed into a regulator to create inverter output voltage reference signal or modulation index.

In the system 10 illustrated in FIG. 1, it should be apparent to those of ordinary skill in the art that different PWM techniques may be used to generate PWM gatings. The DC link voltage input 15 may be from a DC power supply or battery unit. The torque current reference could be from a speed controller, a torque controller or a torque current profile. The current regulation performed by the control unit 100 could be applied with or without feedforward terms. The voltage source inverter 20 could be any topology inverter that converts DC voltage to variable frequency and amplitude AC voltage. The system 10 could be with or without the AC side output LC filter 25. The AC motor 30 could be permanent magnet, wound-field, synchronous reluctance motor or induction motor. The control unit 100 may be implemented using digital signal processing circuitry, analog circuitry, application specific integrated circuit(s) (ASIC), various combinations of hardware/software, etc.

The achievable output voltage and current of the inverter 20 are determined by the physical power ratings of the inverter 20 and the motor 30 and DC link voltage input 15. This relationship is illustrated mathematically as follows:

$$V_d^2 + V_q^2 \leq V_{max}^2, I_d^2 + I_q^2 \leq I_{max}^2$$

where $V_{max}$ and $I_{max}$ are maximum inverter voltage and current. As explained in detail below, embodiments of the present invention provide a voltage limit mechanism and a close-loop field weakening control loop. No lookup table and no system parameters are required in the field-weakening loop.

Figure 2:
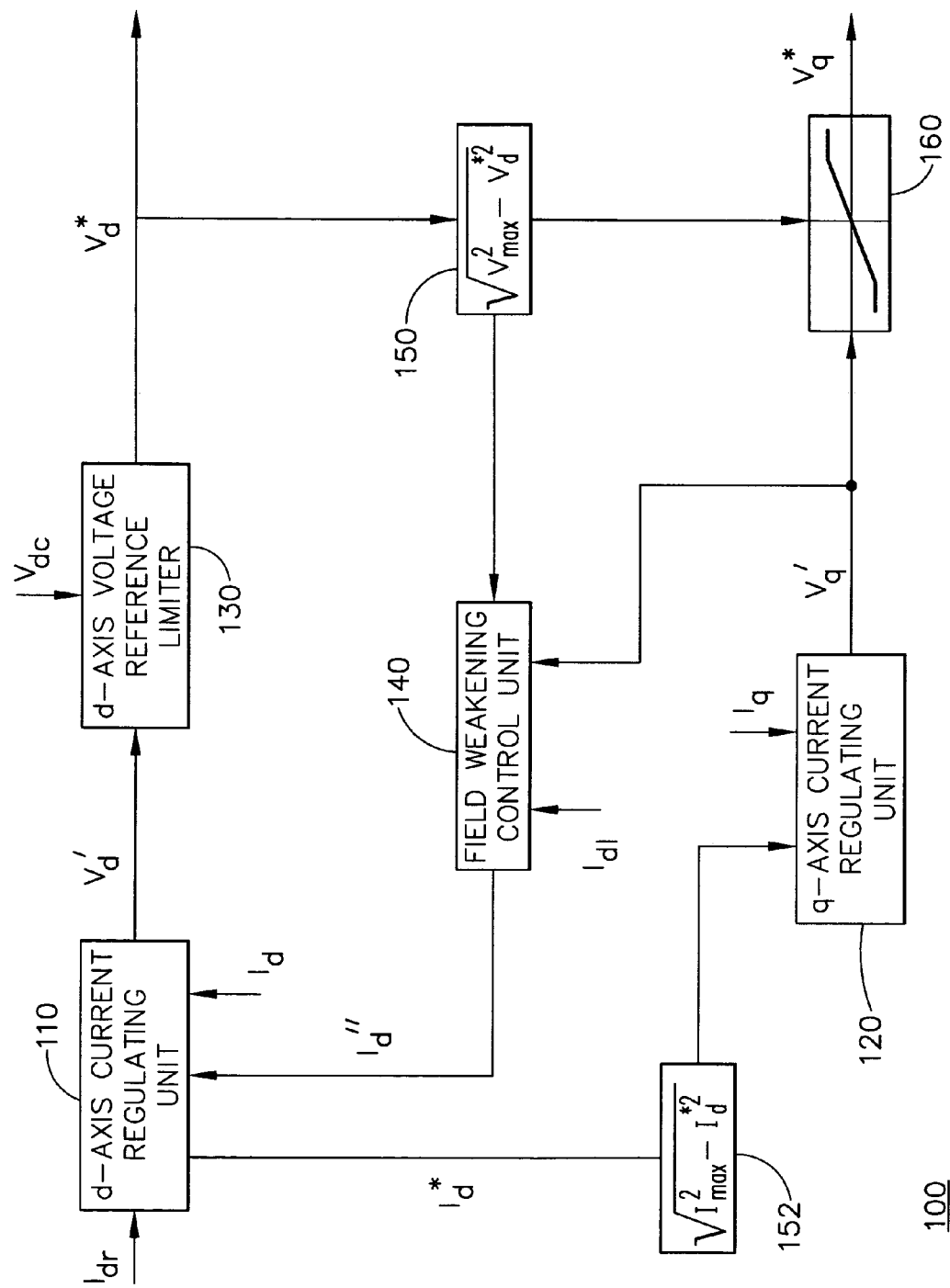
FIG. 2 is a general block diagram illustrating functional components of an inverter control unit according to an embodiment of the present invention.

FIG. 2 is a general block diagram illustrating functional components of the control unit 100 in accordance with an embodiment of the present invention. As illustrated, the control unit 100 includes: a d-axis (field) current regulating unit 110; a q-axis (torque) current regulating unit 120; and a field weakening control unit 140. The control unit 100 further includes: a d-axis voltage reference limiter 130, which limits a d-axis current regulator output voltage ($V_d'$) generated by the d-axis current regulating unit 110, thereby outputting the d-axis inverter command reference voltage ($V_d^*$); and a q-axis voltage reference limiter 160, which limits a q-axis regulator output voltage ($V_q'$) output by the q-axis current regulating unit 120, thereby outputting the q-axis inverter command reference voltage ($V_q^*$). The control unit 100 further includes: a q-axis voltage limit calculator 150; and a q-axis current component limit calculator 152.

Figure 3:
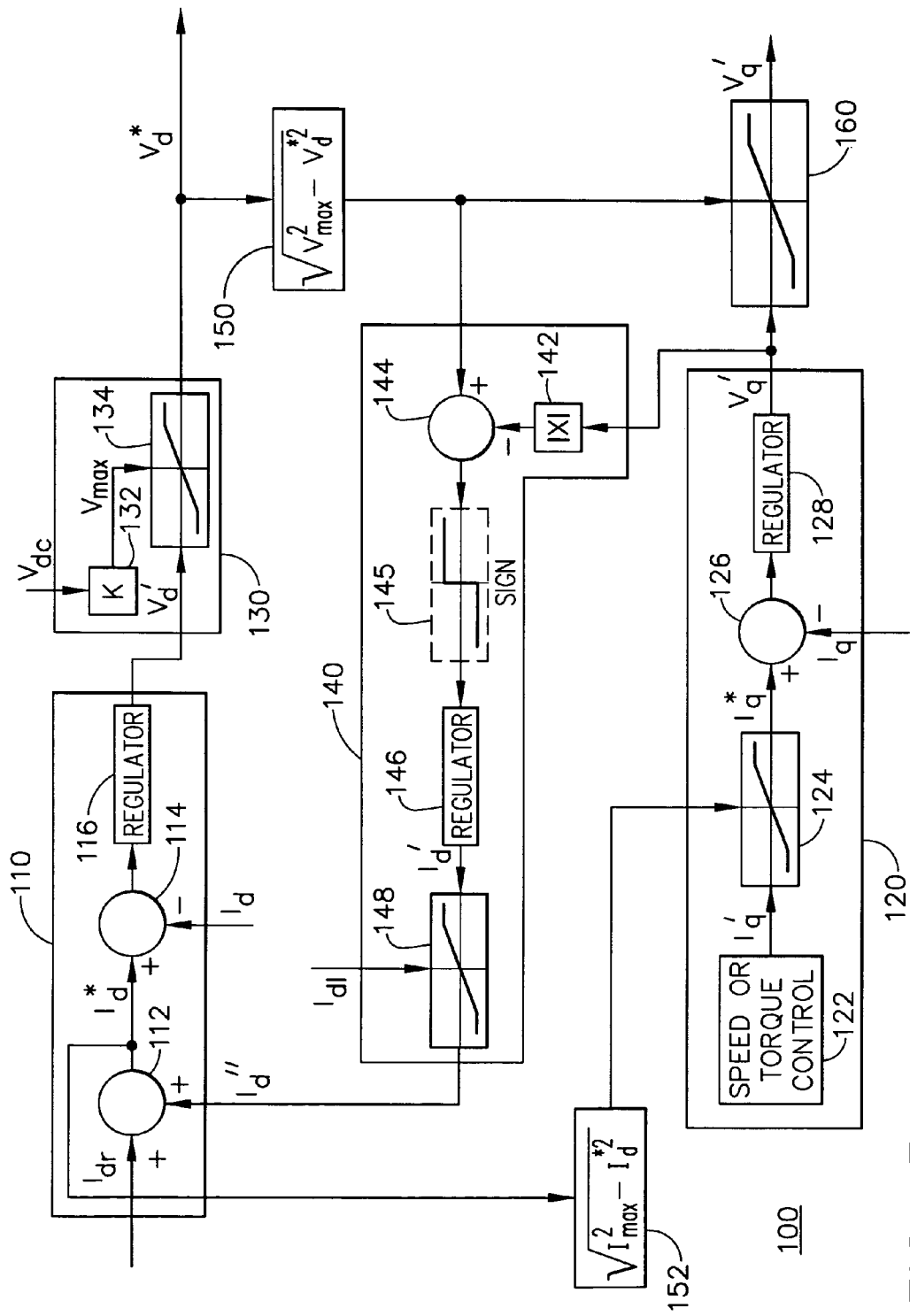
FIG. 3 illustrates, in greater detail, elements of the inverter control unit of FIG. 2 in accordance with an embodiment of the present invention.

FIG. 3 is a block diagram illustrating, in greater detail, an arrangement for the control unit 100 according to an embodiment of the present invention. As illustrated, the d-axis current regulating unit 110 includes: a summing element 112 for summing a field weakening reference signal ($I_d''$) output by the field weakening control unit 140 and the rated field current ($I_{dr}$), thereby generating a d-axis current reference signal ($I_d^*$); a comparing element 114 for generating an error signal based on the difference between the d-axis current reference signal ($I_d^*$) and the detected d-axis inverter output current ($I_d$); and a regulator 116 for generating the d-axis current regulator output signal ($V_d'$) based on the error signal.

As illustrated, the q-axis current regulating unit 120 includes: a speed or torque control element 122 for generating a speed or torque control loop output signal ($I_q'$); a q-axis torque current reference signal limiter 124 for limiting $I_q'$, thereby outputting the q-axis current reference signal ($I_q^*$); a comparing element 126 for comparing the q-axis current reference signal ($I_q^*$) with a detected q-axis inverter output current ($I_q$) to generate an error signal; and a regulator 128 for generating the q-axis current regulator output signal ($V_q'$) based on the error signal.

The field weakening control unit 140 includes: an absolute value calculator 142 for calculating the amplitude of the q-axis current regulator output signal $V_q'$; a comparing element 144, which produces a q-axis voltage error signal as the difference between the output of absolute value calculator 142 and the output of the q-axis voltage limit calculator 150; a polarity calculator 145 for determining the polarity (sign) of the error signal generated by the comparing element 144; a regulator 146 for regulating a field weakening control signal based on the output of the polarity detector 145, thereby generating a field weakening current reference signal ($I_d'$); and a limiter 148 for limiting the field weakening current reference signal ($I_d'$) based on a field weakening current limit ($I_{dl}$), thereby generating the field weakening reference signal ($I_d''$) that is output to the d-axis current regulating unit 110.

In the embodiment illustrated in FIG. 3, the d-axis voltage reference limiter 130 includes a max voltage calculator 132 for calculating maximum voltage available to the inverter 20 as a ratio (K) of the DC link voltage ($V_{dc}$) from the DC link voltage input 15; and a limiter 134 for limiting the d-axis current regulator output signal ($V_d'$) based on $V_{max}$, thereby outputting the d-axis inverter command reference voltage ($V_d^*$). This embodiment assumes the DC link voltage $V_{dc}$ changes dynamically. It should be recognized, however, the principles of the present invention are applicable to the simpler case in which $V_{dc}$ is fixed. In such as case, it is not necessary to dynamically calculate $V_{max}$, which instead will be a constant value.

Although elements of the control unit 100 are shown as discrete elements, it should be recognized that this illustration is for ease of explanation and that functions of these elements may be combined in the same physical element, e.g., in the same microcontroller or in one or more application-specific integrated circuits (ASIC). Additional aspects of the operation of the elements illustrated in FIGS. 2 and 3 will become apparent from the following description.

The d-axis current regulating unit 110 generates the d-axis current reference signal $I_d^*$ based on the result of the field weakening control loop implemented by the field weakening control unit 140. The q-axis current regulating unit 120 generates the q-axis current reference signal $I_q^*$ from the speed or torque control loop output signal $I_q'$ (from the speed or torque control unit 122) through the limiter 124, which applies a limit level ($\sqrt{I_{max}^2 - I_d^{*2}}$) calculated by the q-axis current component limit calculator 152. $I_{max}$ is the maximum current the inverter 20 can provide. Both of the d-axis and q-axis current reference signals $I_d^*$ and $I_q^*$ are compared, by comparing elements 114, 126, respectively, with detected d-axis and q-axis inverter output current signals $I_d$ and $I_q$ to produce current error signals. The current error signals are fed into d-axis and q-axis current regulators 116, 128 to generate d-, q-axis current regulator output signals $V_d'$ and $V_q'$. The d-axis current (field generating component of the stator current) regulator output signal $V_d'$ is sent to the limiter 134, with limit level $\pm V_{max}$, to create final d-axis inverter command reference voltage $V_d^*$. $V_{max}$ is the maximum voltage the inverter 20 can create, which is proportional to the DC link voltage $V_{dc}$. The ratio K between $V_{dc}$ and $V_{max}$ depends on the PWM method adopted. Since $V_d'$ is usually far away from $V_{max}$, d-axis current actually can be controlled without voltage limit. In this way the d-axis current is always under control, i.e., a solid air gap flux can be achieved in transient and steady state, which is advantageous to motor stable operation.

The q-axis current (torque generating component of the stator current) regulator output signal $V_q'$ is sent to the limiter 160, with the limit level $\pm\sqrt{V_{max}^2 - V_d^{*2}}$ calculated by the q-axis voltage limit calculator 150, to create the final q-axis inverter command reference voltage $V_q^*$. This limit mechanism 160 can ensure that there is no over modulation during transient and steady state, if required, which can prevent high frequency resonance for the drive systems with AC side output LC filters 25.

The field weakening control unit 140 is part of an outer q-axis voltage regulation loop to generate a field-weakening current reference signal. The goal of this loop is to output a signal that allows the d-axis current regulating unit 110 to adjust the d-axis current reference signal $I_d^*$ to make the amplitude of the output signal of the q-axis current regulator $|V_q'|$ lower or equal than limit level $\sqrt{V_{max}^2 - V_d^{*2}}$. In this way, there is $\sqrt{V_d^{*2} + V_q^{*2}} \leq V_{max}$ i.e., d-axis and q-axis current loops can be fully controlled without voltage limit. To achieve this, the comparing element 144 of the field weakening control unit 140 compares the amplitude of the q-axis current regulator output signal $|V_q'|$ with $\sqrt{V_{max}^2 - V_d^{*2}}$ to produce a q-axis voltage error signal. This error signal, or the sign of this error signal as determined by the polarity calculator 145 (optional), is fed into the regulator 146 to generate the field weakening current reference signal $I_d'$. $I_d'$ is sent into the limiter 148 with limit level $-I_{dl}$ to 0 to create the field weakening reference signal $I_d''$ that is sent to the d-axis current regulating unit 110. $I_{dl}$ is the field weakening current limit to prevent deep demagnetization of rotor permanent magnets. The sum of the field weakening reference signal $I_d''$ and the rated field current $I_{dr}$, as calculated by the summing element 112, is the final d-axis current reference signal $I_d^*$.

For an induction motor, the rotor magnetizing field is excited by stator current, $I_{dr}$ is the rated field current. When motor speed is lower than base speed, $I_d''$ is zero and $I_d^*$ will be $I_{dr}$. After motor speed is higher than base speed, $I_d''$ is a negative value and $I_d^*$ will be lower than $I_{dr}$. Field will be weakened to lower down back EMF to achieve field weakening operation. For synchronous motors, rotor magnetizing field is excited by the rotor itself. $I_{dr}$ is set to zero. When motor speed is lower than base speed, $I_d''$ is zero and $I_d'$ will be zero i.e., no field weakening is applied. After motor speed is higher than base speed, $I_d''$ is a negative value and $I_d^*$ will also be negative, i.e., field weakening will be applied. If the error signal output by the comparing element 144 of the field weakening control unit 140 is used by the regulator 146 to generate field-weakening current, the field weakening control loop parameters will be important for the stability of the system. Better dynamic performance, however, can be achieved. For the system with lenient dynamic performance requirements, the sign of the error signal for field weakening current adjustment, as calculated by the polarity detector 145 of the field weakening control unit 140, is more preferable because the tuning of the field weakening control is simplified.

In the above-described embodiment, the field weakening reference current is always maintained under the voltage limit condition, while the torque reference current is controlled with the limit of available DC bus voltage and the voltage that has already been used for generating the required field current. Thus, the field current demand has higher priority than the torque current under the limitations of both DC link voltage and inverter maximum current. In this way, a stable field is always guaranteed, which is a basic condition of a stable operation for a motor drive system. The above-described embodiment achieves this effect by applying the following logic:

1) First, the field weakening $I_d^*$ is only limited by $I_{dl}$, which is maximum allowable field weakening defined by the system.
2) Second, $V_d'$ required by $I_d^*$ is only limited by $V_{max}$, which is defined by the system (max. available DC bus).
3) Then, the torque $I_q^*$ is limited by $\sqrt{I_{max}^2 - I_d^{*2}}$, where $I_{max}$ is defined by the inverter capability.
4) Fourth, $V_q^*$ required by $I_q^*$ is limited by $\sqrt{V_{max}^2 - V_d^{*2}}$.
5) Field weakening close loop control is applied.

As described above, the embodiment illustrated in FIG. 3 assumes that the DC link voltage $V_{dc}$ changes dynamically. It should be recognized, however, the principles of the present application are applicable to the simpler case in which $V_{dc}$ is fixed. In such as case, it is not necessary to dynamically calculate $V_{max}$, which instead will be a constant value, and there is no need for DC link voltage detection. In such an implementation, a maximum modulation index ($d_{max}$) for the inverter can be adopted for control, instead of the dynamically changing $V_{max}$. In this scheme, the output signals of the d-axis and q-axis current regulating units, 110, 120, are inverter modulation index signals $d_d'$ and $d_q'$, instead of $V_d'$ and $V_q'$. The limits imposed on $d_d'$ and $d_q'$ are $d_{max}$ and $\sqrt{d_{max}^2 - d_d^2}$, respectively, instead of $V_{max}$ and $\sqrt{V_{max}^2 - V_d^{*2}}$. The field weakening control error signal is $\sqrt{d_{max}^2 - d_d^2} - |d_q'|$ instead of $\sqrt{V_{max}^2 - V_d^{*2}} - |V_q'|$. Other aspects remain the same. This simplified embodiment may be applied, for example, to a battery fed system.

We claim:

1. A method of controlling a power converter of an AC motor drive system, said method comprising:

generating a field current regulating signal to control a field current component flowing from said power converter to the AC motor, thereby achieving field current regulation;

generating a torque current regulating signal to control a torque current component flowing from said power converter to the AC motor, thereby achieving torque current regulation, said torque current regulation having lower priority than said field current regulation; and executing a close-loop field weakening control scheme, which generates a field weakening control command as a function of the difference between a torque current regulation voltage demand and voltage available for torque current regulation, wherein said field current regulating signal is adjusted in accordance with said field weakening control signal to selectively reduce back EMF of said AC motor, thereby enabling said step of generating a toque current regulating signal to achieve a toque current component needed to drive the AC motor at a desired speed despite a limitation on DC voltage available to said power converter.

2. The method according to claim 1, wherein said DC voltage available to said power converter is variable.

3. The method according to claim 1, wherein
said DC voltage available to said power converter is constant; and
said step of generating a field current regulating signal and said step of generating a torque current regulating signal generate modulation index signals for said power converter.

4. The method according to claim 1, wherein said field current regulating signal is a d-axis voltage reference signal, which is limited based on DC voltage available to said power converter.

5. The method according to claim 4, wherein said torque current regulating signal is a q-axis voltage reference signal, which is limited based on the DC voltage available to said power converter and the level of said d-axis voltage reference signal.

6. The method according to claim 5, wherein said q-axis voltage reference signal is limited as a function of $\sqrt{V_{max}^2 - V_d^{*2}}$, where $V_{max}$ is the maximum DC voltage available to the power converter and $V_d^*$ is the d-axis voltage reference signal.

7. The method according to claim 5, wherein said field weakening control scheme generates said field weakening control signal based on a polarity of voltage saturation, which indicates a saturation condition for said q-axis voltage reference signal.

8. The method according to claim 5, wherein said field weakening control scheme generates said field weakening control signal based on an error amplitude, calculated as the difference between $\sqrt{V_{max}^2 - V_d^{*2}}$ and $|V_q'|$, where $V_q'$ is a q-axis current regulation output signal.

9. The method according to claim 1, wherein
said step of generating the field current regulating signal limits a field component of current as a function of maximum allowable field weakening; and
said step of generating the torque current regulating signal limits a torque component of current based on $\sqrt{I_{max}^2 - I_d^{*2}}$, where $I_{max}$ is maximum current said power converter can provide and $I^*_d$ is a d-axis reference current.

10. The method according to claim 1, wherein said field weakening control scheme automatically adjusts said field weakening control signal to achieve stable system performance during transient conditions.

11. The method according to claim 1, wherein said power converter is a voltage source inverter.

12. The method according to claim 1, wherein the AC motor of said motor drive system is a permanent magnet, wound-field, synchronous reluctance motor or an induction motor.

13. The method according to claim 1, wherein said motor drive system is an aerospace motor drive system.

14. The method according to claim 1, wherein said motor drive system includes an LC filter on an output side of said power converter.

15. A power converter controlling apparatus for controlling a power converter of an AC motor drive system, said controlling apparatus comprising:
- a field current controller for generating a field current regulating signal to control a field current component flowing from said power converter to the AC motor, thereby achieving field current regulation;
- a torque current controller for generating a torque current regulating signal to control a torque current component flowing from said power converter to the AC motor, thereby achieving torque current regulation, said torque current regulation having lower priority than said field current regulation; and
- a field weakening controller for executing a close-loop field weakening control scheme, which generates a field weakening control command as a function of the difference between a torque current regulation voltage demand and voltage available for torque current regulation,
- wherein said field current controller adjusts said field current regulating signal in accordance with said field weakening control signal to selectively reduce back EMF of said AC motor, thereby enabling said torque current controller to output a torque current regulating signal to achieve a torque current component needed to drive the AC motor at a desired speed despite a limitation on DC voltage available to said power converter.

16. The apparatus according to claim 15, wherein said DC voltage available to said power converter is variable.

17. The apparatus according to claim 15, wherein
said DC voltage available to said power converter is constant; and
said field current controller and said torque current controller generate modulation index signals for said power converter.

18. The apparatus according to claim 15, wherein said field current regulating signal is a d-axis voltage reference signal, which is limited based on DC voltage available to said power converter.

19. The apparatus according to claim 18, wherein said torque current regulating signal is a q-axis voltage reference signal, which said torque current controller limits based on the DC voltage available to said power converter and the level of said d-axis voltage reference signal.

20. The apparatus according to claim 19, wherein said q-axis voltage reference signal is limited as a function of $\sqrt{V_{max}^2 - V_d^{*2}}$, where $V_{max}$ is the maximum DC voltage available to the power converter and $V_d^*$ is the d-axis voltage reference signal.

21. The apparatus according to claim 19, wherein said field weakening controller generates said field weakening control signal based on a polarity of voltage saturation, which indicates a saturation condition for said q-axis voltage reference signal.

22. The apparatus according to claim 19, wherein said field weakening controller generates said field weakening control signal based on an error amplitude, calculated as the difference between $\sqrt{V_{max}^2 - V_d^{*2}}$ and $|V_q'|$, where $V_q'$ is a q-axis current regulation output signal.

23. The apparatus according to claim 15, wherein
said field current controller limits a field component of current as a function of maximum allowable field weakening; and
said torque current controller limits a torque component of current based on $\sqrt{I_{max}^2 - I_d^{*2}}$, where $I_{max}$ is maximum current said power converter can provide and $I^*_d$ is a d-axis reference current.

24. The apparatus according to claim 15, wherein said field weakening controller automatically adjusts said field weakening control signal to achieve stable system performance during transient conditions.

25. The apparatus according to claim 15, wherein said power converter is a voltage source inverter.

26. The apparatus according to claim 15, wherein the AC motor of said motor drive system is a permanent magnet, wound-field, synchronous reluctance motor or an induction motor.

27. The apparatus according to claim 15, wherein said motor drive system is an aerospace motor drive system.

28. The apparatus according to claim 15, wherein said motor drive system includes an LC filter on an output side of said power converter.

* * * * *